E. TURNER.
GAS BURNER.
APPLICATION FILED MAY 15, 1918.

1,405,360.

Patented Jan. 31, 1922.
3 SHEETS—SHEET 1.

Inventor:—
Ernest Turner
By his Attorney:— Walter Gunn

E. TURNER.
GAS BURNER.
APPLICATION FILED MAY 15, 1918.

1,405,360.

Patented Jan. 31, 1922.
3 SHEETS—SHEET 3.

Inventor:
Ernest Turner
By his Attorney: Walter Gunn

UNITED STATES PATENT OFFICE.

ERNEST TURNER, OF URMSTON, NEAR MANCHESTER, ENGLAND.

GAS BURNER.

1,405,360.  Specification of Letters Patent.  Patented Jan. 31, 1922.

Application filed May 15, 1918. Serial No. 234,775.

(GRANTED UNDER THE PROVISIONS OF THE ACT OF MARCH 3, 1921, 41 STAT. L., 1313.)

*To all whom it may concern:*

Be it known that I, ERNEST TURNER, a subject of the King of Great Britain and Ireland, and resident of Urmston, near Manchester, England, have invented certain new and useful Improvements in or Relating to Gas Burners, (for which I have filed an application in Great Britain and Ireland, application 6,635, dated May 10, 1917, Patent 115,490, accepted May 10, 1918,) of which the following is a specification.

This invention refers to a new or improved construction of burner for use with pressure gas lighting and heating systems using a self-burning mixture (gas and air already mixed), the object of the invention being a burner comprising comparatively few parts and lying in very small compass whilst adapted to afford all the advantages, without the disadvantages, of the larger and more complicated form of burner heretofore employed, besides also allowing of its being used with existing piping hitherto employed with burners using other than a self-burning mixture, that is to say, those wherein the gas and air are mixed in the burner. A further object is to provide a burner which when employed, either for lighting or heating, allows the volume of combustible mixture flowing through to be reduced to a minimum without impairing its efficiency and without any liability to back fire, perfect combustion being maintained throughout all controls.

According to the invention, the improved burner comprises two main parts, a nipple or connector and a burner head, the nipple fitting into the burner head and having laterally disposed holes or passages constituting the high velocity jet or jets whereby the direction of flow of the combustible mixture, on passing through the burner, is changed, and whereby the velocity of the mixture is subsequently checked until even diffusion takes place, the burner head being so formed as to produce a chamber between itself and the nipple whereby the mixture is pre-heated prior to reaching the burner orifice without considerable expansion of the combustible mixture.

The invention will be more particularly described by the aid of the accompanying drawings wherein:

Fig. 4 is a cross-sectional plan view on the line 4, 4, Fig. 3, while

Referring to Figs. 1 to 5, the nipple or connector $a$ is in the form of a short hollow bush, screwed internally at $a'$ so as to be adapted to connect the burner to the supply pipe $b$ and also screwed externally at $a^2$ so as to screw into the burner head $c$. Forming part of the connector $a$ is a small tubular extension $d$ constituting the nipple proper, such tubular extension being closed at one end and having near such end a series of small holes $d'$. These holes $d'$ lie radial to the longitudinal axis of the nipple and constitute the high velocity jets.

The burner head $c$ is also tubular and comparatively short, and at one part is screw-threaded internally to receive the screwed portion $a^2$ of the nipple, whilst at another part it is shouldered down at $c'$ to form the nozzle $c^2$.

Figure 11:
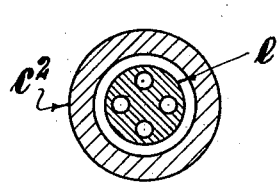
Figs. 11, 12 and 13 are cross sectional views of the burner head showing modified forms of the nozzle restrictor
Figure 12:
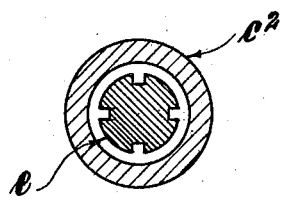
Figure 13:
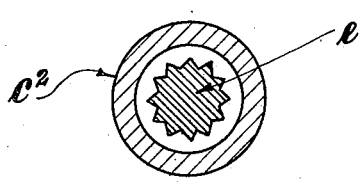

Projecting into the latter is the extension $e$ grooved or serrated as illustrated in Figs. 11 to 13 respectively. The said extension is for the purpose of conveying the heat of combustion away from the flame (and thus extinguishing the same) when for any reason the velocity of the combustible mixture is lower than the speed of the propagation of the flame and thus preventing back firing and also serving to shape the flame according to requirement.

With the improved burner in use the self-burning mixture enters the connector $a$ and passing through the high velocity jet orifices $d'$ near the closed end of the nipple, enters the chamber within the burner head $c$. The combustible mixture leaves the high velocity jet at right angles to the normal direction of the flow and as it impinges upon the side walls of the burner head $c$ said mixture is evenly diffused over the entire area of the burner head in substantially the same horizontal plane as said high velocity jets, hence the burner nozzle or mantle can be placed in close juxta-position to the high velocity jets without any fear of the combustible mixture being delivered unevenly thereto as is the case with existing burners in which the high velocity jets are arranged to deliver the mixture in a direction co-axial with the normal flow.

The usual means for obviating such disadvantages is to insert an expansion chamber between the burner head and nipple of sufficient length to effect said diffusion before the mixture reaches the outlet nozzle.

The mixture becomes pre-heated by the heat of the burner head and after being so pre-heated the mixture passes to the burner.

By employing a burner of this construction with self-burning mixtures, it is found that it may be made to very small dimensions (a fitting $1\frac{3}{4}$ inches long by $\frac{5}{8}$ of an inch in diameter constituting a 100 candle power lamp) and further, that it allows of the mixture passing to the burner being reduced to the smallest volume i. e. until the flame is almost extinguished without any smell of unburnt gas. Moreover, it allows of the burner being used with existing piping for lighting or heating which has hitherto been used for the other than self-burning mixtures.

Figure 6:
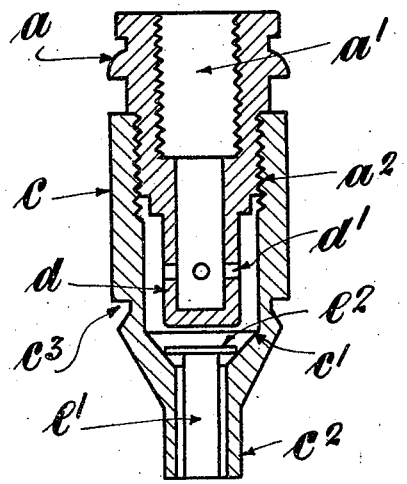
Figs. 6 and 7 are sectional elevations of two modified forms of the improved burner.

Instead of forming the member $e$, as an extension of the nipple $d$ it may be a separate fitting $e'$, see Fig. 6, carried by the cross-bar $e^2$ secured within the burner head.

Figure 7:
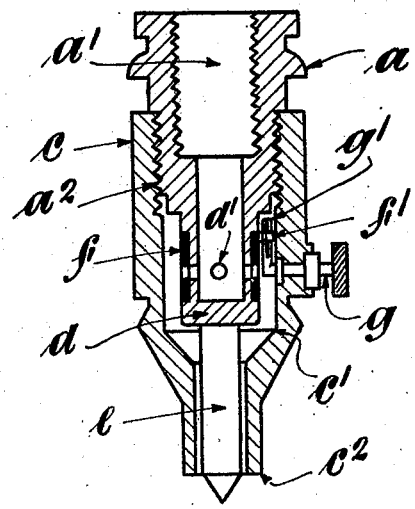
Figure 14:
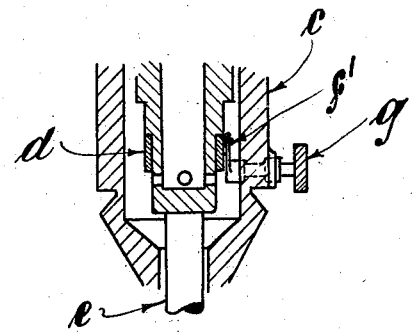
Fig. 14 is a sectional elevation corresponding to Fig. 7 but showing modified means for controlling the lateral passages.

In arranging the lateral holes however at a short distance above the closed end of the nipple, the latter serves as a dust trap. Also if desired provision may be made to regulate the amount of combustible mixture flowing through the openings and this may be conveniently effected as illustrated in Fig. 7, wherein a rotatable sleeve $f$ or sliding plunger is placed around the nipple, said sleeve having radial holes formed therein to correspond with those in the nipple and being actuated from the exterior through the spindle $g$, which is provided with a crank arm $g'$ to engage the projection $f'$ on the sleeve $f$. Instead of the rotatable sleeve $f$ a slidably arranged sleeve may be used see Fig. 14.

When the burner is used for lighting, provision such as the groove $c^3$, or the like, is made upon the exterior of the burner head for detachably supporting an incandescent mantle.

Figure 8:
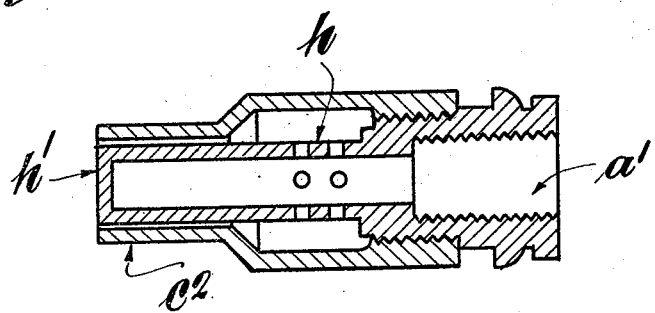
Figs. 8 and 9 are sectional elevations of two forms of the improved burner adapted for heating purposes.
Figure 9:
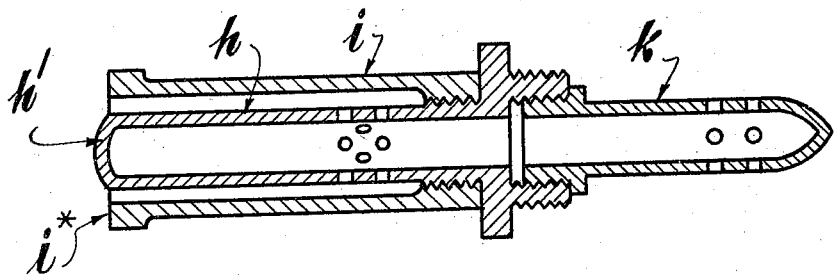

Fig. 8 shows the invention applied to a burner for heating purposes or for lamps of large candle power and in this case the nipple $h$ is extended at $h'$ to the nozzle outlet. With such burners of comparatively large size, or where large volumes of mixture are used the burner head $i$ is continued straight forward as illustrated in Fig. 9 to the nozzle $i^*$ without any reduced portion and if desired an auxiliary nipple $k$ may be secured at the rear end of the first, said second nipple also having high velocity jets formed therein at substantially right angles to the normal direction of the flow of the mixture. Said auxiliary nipple constitutes a further safe-guard against any liability of the burner to back-fire.

Figure 1:
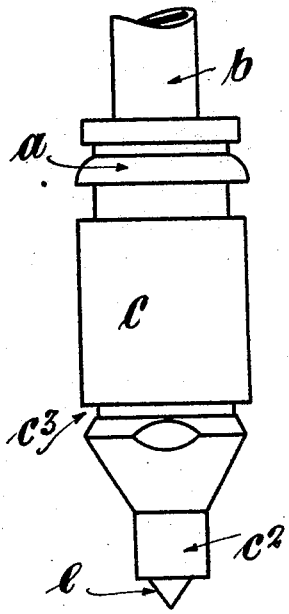
Fig. 1 is an exterior view of a form of burner constructed according to the invention adapted for incandescent lighting drawn to an enlarged scale.
Figure 3:
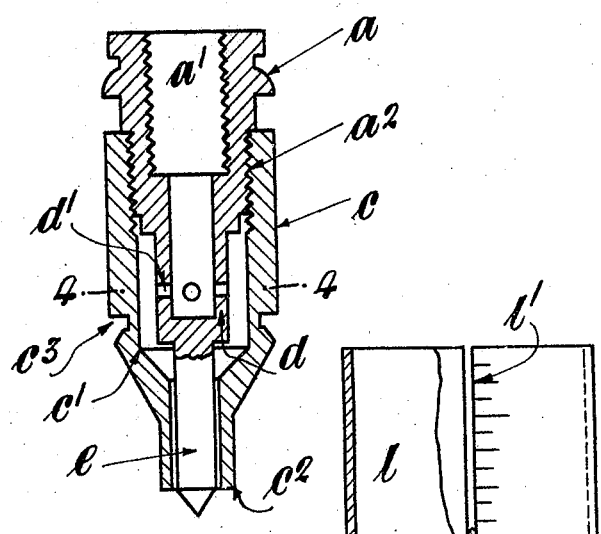
Fig. 3 is a sectional elevation of the same.
Figure 2:
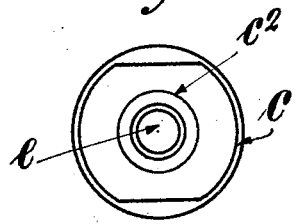
Fig. 2 is an inverted plan view of said burner.
Figure 4:
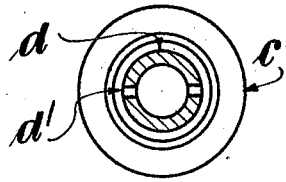
Figure 5:
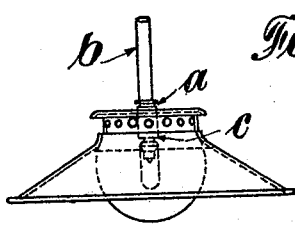
Fig. 5 shows said burner in use.
Figure 10:
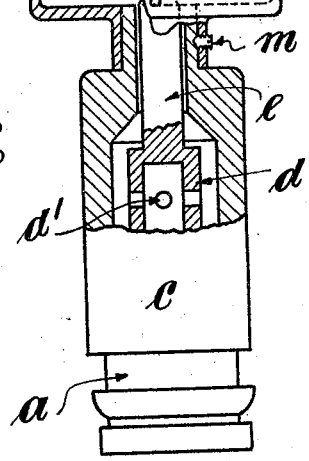
Fig. 10 is a cross sectional view showing the invention adapted as a trial or test burner.

When it is desired to use the improved burner as a test burner, i. e. to see if the gas and air are pre-mixed in the right proportions to constitute an oxidizing, reducing or neutral flame as desired, a tubular fitting $l$ (see Fig. 10) is attached to one of the burner nozzles $c^2$ at a convenient part of the system, by suitable means such as the grub screw $m$, bayonet slot or the like may be used. The fitting $l$ is slotted at $l'$ and the edges of said slot calibrated as shown, so that by observing the height of the inner cone of the flame the character of said flame can be gauged and if necessary regulated by adjusting the proportionate volumes of air and gas fed to the installation.

What I claim is:—

1. Burners for use in gas lighting and heating systems using a self-burning mixture comprising an outer tubular body part constituting a casing having a burner orifice at one end, a central heat absorbing core located in the orifice around which the combustible gases pass, a nipple within the casing communicating with the fuel supply and having outlet passages constituting high velocity jets arranged substantially at right angles to the normal direction of the flow of the combustible mixture, substantially as described.

2. A burner for self-burning mixtures comprising a body part formed with a burner nozzle, a nipple within the body having high velocity jets adapted to project the combustible mixture at right angles to the normal direction of flow, said nipple having a central heat absorbing extension projecting into the burner nozzle, substantially as described.

3. A burner for self-burning mixtures comprising a body part formed with a burner nozzle, a nipple within the body having high velocity jets adapted to project the combustible mixture at right angles to the normal direction of flow said nipple having a hollow heat absorbing extension projecting into the burner nozzle, substantially as described.

4. Burners for us in gas lighting and heating systems using a self-burning mixture comprising an outer tubular body part constituting a casing having a burner orifice at one end, a central heat absorbing core located in the orifice around which the combustible gases pass, a nipple within the casing communicating with the fuel supply and having outlet passages constituting high velocity jets arranged substantially at right angles to the normal direction of the flow of the combustible mixture, the cylindrical burner having a tubular extension povided with a sight opening marked along the edge to afford constants for comparing the character of the flame with standard measurements, substantially as described.

In witness whereof I have hereunto set my hand in the presence of two witnesses.

ERNEST TURNER.

Witnesses:
HENRY JUNCA,
FRED J. MEREDITH.